Jan. 15, 1935. J. L. BROWN ET AL 1,987,664
WELDING APPARATUS
Filed Jan. 14, 1933 2 Sheets-Sheet 2
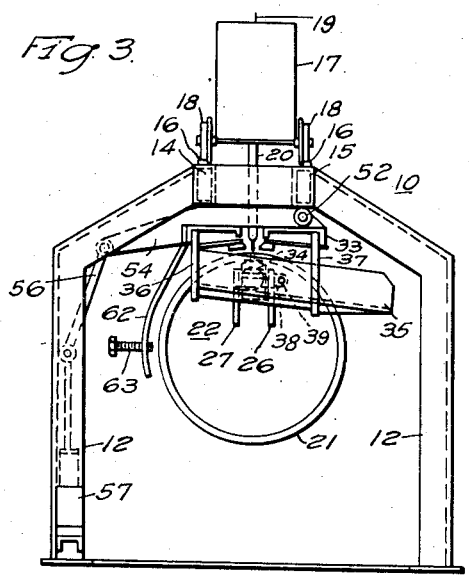
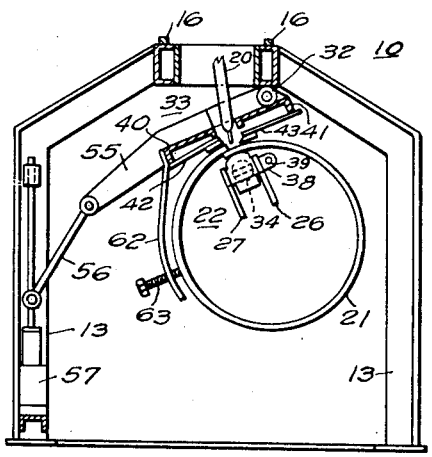
INVENTORS.
John L. Brown and
Theodore C. Fockler.
BY
ATTORNEY Patented Jan. 15, 1935

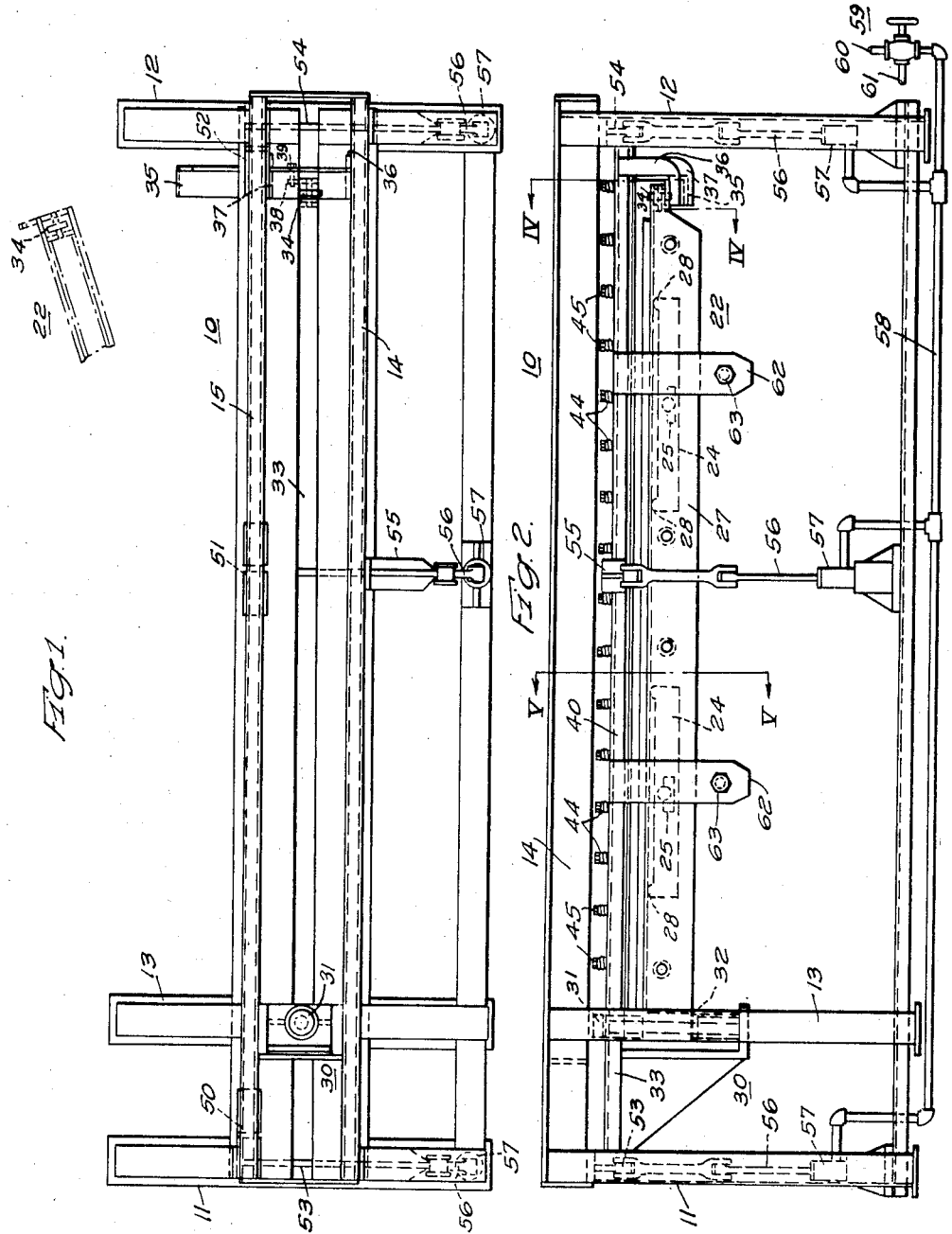

1,987,664

UNITED STATES PATENT OFFICE 1,987,664

WELDING APPARATUS

John L. Brown, Verona, and Theodore C. Fockler, Wilkinsburg, Pa., assignors to Westinghouse Electric & Manufacturing Company, East Pittsburgh, Pa., a corporation of Pennsylvania Application January 14, 1933, Serial No. 651,688

9 Claims. (Cl. 219—17)

Our invention relates, generally, to welding apparatus and it has particular relation to arc welding apparatus.

The object of our invention, generally stated, is to provide a welding machine for supporting a welding blank, such as a large diameter pipe, in position for welding a longitudinal joint thereon, which shall be simple and efficient in operation and which may be readily and economically manufactured and installed.

The principal object of our invention is to provide for loading a welding blank into a welding machine with a minimum of manual effort.

Still another object of our invention is to provide for tilting a welding blank in a welding machine so that a lap weld may be readily made.

Other objects of our invention will, in part, be obvious and, in part, appear hereinafter.

Our invention, accordingly, is disclosed in the embodiment thereof shown in the accompanying drawings and comprises the features of construction, combination of elements and arrangement of parts which will be exemplified in the construction hereinafter set forth and the scope of the application of which will be indicated in the appended claims.

For a more complete understanding of the nature and scope of our invention, reference may be had to the following detailed description taken in connection with the accompanying drawings, in which Figure 1 is a view in top plan of a welding machine embodying our invention.

Fig. 2 is a view, in side elevation, of the welding machine illustrated in Fig. 1.

Fig. 3 is a view in end elevation of the welding machine shown in Fig. 2.

Fig. 4 is a view taken along the line IV—IV of Fig. 2 showing the position of the apparatus for lap welding, and Fig. 5 is an enlarged sectional view taken along the line V—V of Fig. 2 showing, in more detail, certain specific features of our invention.

Referring now to the drawings, the reference character 10 designates generally a main frame comprising end members 11 and 12, and an intermediate member 13, which are secured together by means of longitudinal beams 14 and 15. It will be observed that the longitudinal beams 14 and 15 are constructed of a channel member and a plate welded thereto. However, it will be apparent that any other suitable construction may be used in order to form the beams 14 and 15 to provide a sufficient supporting structure for the welding apparatus.

The beams 14 and 15 are provided with a track 16 on which an automatic welding head 17 may be positioned. The welding head 17 is provided with wheels 18 that are arranged to traverse the track 16 in the customary manner. The automatic welding head 17 may be of any suitable type, well known in the art, which is arranged to feed an electrode, such as a metallic electrode 19, through a nozzle 20 to perform a welding operation along the joint of a welding blank such as the pipe 21, illustrated in Fig. 3 of the drawings.

In order to support the welding blank 21, a back-up member, shown generally at 22, is provided. The back-up member 22 comprises a back-up bar 23, more clearly illustrated in Fig. 5, which is arranged to be positioned directly underneath the joint in the welding blank 21 in order to provide for maintaining the molten weld metal in the joint and also for carrying the excessive heat away from the joint to prevent the burning thereof while the welding operation is being performed. Due to the fact that the back-up member 22 is of a relatively great length so that long blanks 21 may be welded thereon, it is desirable to support the back-up bar 23 at a plurality of points rather than to support it merely at its ends.

As illustrated in the drawings, the back-up bar 23 is supported by means of supporting members 24 that are pivotally mounted in suitable bearings 25 on longitudinal support members 26 and 27. The pivotally mounted support members 24 are provided with projections 28 which are arranged to make only line contact engagement with the underside of the back-up bar 23. In reality, therefore, the back-up bar 23 is supported at four points and, since the bearing members 25 are permitted to move downwardly in substantially parallel lines on the application of load to the back-up bar 23 and, further, since the support members 24 are pivotally mounted, the back-up bar 23 will be held substantially straight and the deflection thereof from a straight line will be limited to a minimum.

Since it is desirable to provide for loading the welding blank 21 into the welding machine from the side rather than from the end, the back-up member 22 is hinged at the left hand end and is permitted to be swung to the side of the machine as shown by the dot and dash illustration of the back-up member 22 in Fig. 1 of the drawings. In order to permit the swinging movement of the back-up member 22, a bearing structure, shown generally at 30, is provided, together with a king pin 31, which is arranged to engage a suitable bearing 32 in the end of the back-up member 22. The bearing structure 30 is carried by a clamping member, shown generally at 33, which will be described in detail hereinafter.

In order to support the right hand end of the back-up member 22 to maintain the back-up member in a substantially level position, a roller 34 is provided, as illustrated, and is mounted for rotation about a longitudinal axis of the back-up member 22. A runway or incline 35 is provided for the roller 34 which may be supported by means of L-shaped members 36 and 37, that are carried by the clamping member 33. In order to secure the back-up member 22 in the position illustrated in Fig. 3 of the drawings so that the welding blank 21 will be properly held in the welding position, an ear 38 is provided on the longitudinal member 26 and a suitable pin 39 is arranged to engage an opening in the side of the incline 35 and a corresponding opening in the ear 38.

The clamping member 33 comprises two longitudinally extending channels 40 and 41 which are provided with clamping fingers 42 and 43 on the underside thereof for engaging the edges of the blank 21 to be welded, as is more clearly shown in Fig. 5 of the drawings. The fingers 42 and 43 are biased out of engagement with the edges of the blank 21 by means of compression springs 44 which are connected to the fingers 42 and 43 by means of bolts 45. In order to force the clamping fingers 42 and 43 into engagement with the blank 21 expansible hose members 46 and 47 are provided underneath the channel members 40 and 41, respectively, and may be connected to a suitable source of fluid pressure, not shown, such as air for expanding them to obtain the desired clamping action between the fingers 42 and 43 and the blank 21.

In order to facilitate the loading of the welding blank 21 into the machine, and further, in order to permit the tilting of the welding blank to the position illustrated in Fig. 4 of the drawings so that a lap weld may be readily made, the clamping member 33 is hinged at the ends and at the center from underneath the longitudinal beam 15 as at 50, 51 and 52. Operating arms 53 and 54 are provided at the end of the channel members 40 and 41 and an intermediate operating arm 55 is provided at the center. The operating arms 53, 54 and 55 are connected by means of suitable toggle joints 56 to air cylinders 57, all of which may be connected to a common air line 58 and controlled by means of a single valve 59 which is arranged to apply the air pressure to the cylinders 57 from an intake pipe 60 and to exhaust it therefrom through an outlet pipe 61.

In order to support the welding blank 21 in the desired position, when it is tilted to permit the making of a lap joint, braces 62 are provided and secured to one side of the channel member 40, as illustrated. Each of the braces 62 is provided with an adjusting screw 63 so that various diameters of welding blanks 21 may be readily accommodated in a single machine.

In operation, in order to load a welding blank 21 into the machine, air pressure is applied by means of the valve 59 to the air cylinders 57 so that the clamping member 33 is in the upper or level position. The back-up member 22 is then swung to the dotted position illustrated in Fig. 1 of the drawings. After the welding blank 21 has been loaded onto the back-up member 22 so that the joint is centrally located on the back-up bar 23, the back-up member 22 is swung inwardly until the roller 34 engages the incline 35. Since this movement is carried on in a vertical plane, it will be readily understood that very little effort will be required to swing the back-up member 22 with the loaded welded blank 21 thereon to such a position that the roller 34 will engage the incline 35.

By means of the valve 59, the air pressure is removed from the air cylinders 57 so that the clamping member 33 is tilted to the position illustrated in Fig. 4 of the drawings. In this position, the left-hand end of the incline 35 will be lower than the right-hand end, as viewed in Fig. 3 and, as a result, the back-up member 22 will, by its own weight, be caused to move into the welding position. The pin 39 is then inserted to secure the welding blank 21 in the desired position and the clamping member 33 is raised to the level position by operating the control valve 59 to admit air to the cylinders 57. Air pressure is applied to the expansible hose members 46 and 47 to force the clamping fingers 42 and 43 into engagement with the edges of the blank 21, which will then be in the position for making the customary butt weld as illustrated in Fig. 5 of the drawings.

The welding head 17 is then energized to traverse the length of the joint and to feed the welding electrode 19 in order to form the weld in the well-known manner.

After the welding operation has been performed, the pin 39 may be readily removed by releasing a portion of the air from the cylinders 57 to tilt the clamping member 33 slightly. The pin 39 having been removed, the clamping member 33 is again brought to the level position and the air pressure is released from the hose members 46 and 47. The welding blank 21 will then be free to move to the side of the machine as carried by the back-up member 22 under the influence of its own weight to the position illustrated in Fig. 1 of the drawings. It may then be removed and a second welding blank loaded onto the back-up member 22 and the operation repeated.

In the event that it is desired to make a lap weld instead of the butt weld described hereinbefore, the clamping member 33 is maintained in the tilted position, as illustrated in Fig. 4 of the drawings, so that the welding electrode 19 may be fed into the lowermost corner of the lap joint from a substantially vertical direction to perform the welding operation. After the lap weld operation has been performed, air pressure may be re-applied to the cylinders 57 to raise the clamping member 33 to the horizontal position, where, the pin 39 being removed, the blank 21 may be swung outwardly, as set forth hereinbefore.

Since certain further changes may be made in the above construction and different embodiments of the invention may be made without departing from the scope thereof, it is intended that all matter contained in the above description or shown in the accompanying drawings shall be interpreted as illustrative and not in a limiting sense.

We claim as our invention:

1. Support means for a welding blank comprising, in combination, a main frame, clamping means disposed to be positioned along the edges of the joint to be welded for securing the blank in welding position, said clamping means being hinged to the main frame to permit the blank to rotate about a horizontal axis, and a back-up member carried by the clamping means and disposed to be positioned underneath the joint to be welded to cooperate with the clamping means in securing the blank in welding position.

2. Support means for a welding blank comprising, in combination, a main frame, clamping means disposed to be positioned along the edges of the joint to be welded for securing the blank in welding position, said clamping means being hinged to the main frame to permit the blank to rotate about a horizontal axis, and a back-up member carried by the clamping means and disposed to be positioned underneath the joint to be welded to cooperate with the clamping means in securing the blank in welding position, said back-up member being pivotally mounted on the clamping means to permit the loading of the welding blank thereon at the side of the main frame.

3. Arc welding apparatus comprising, in combination, a main frame, clamping means carried by the main frame for securing the abutting edges of a blank in position for welding, said clamping means being hinged to the main frame to permit the blank to rotate about a horizontal axis, a back-up member carried by the clamping means and disposed to be positioned underneath the joint to be welded to cooperate with the clamping means in securing the blank in welding position.

4. Arc welding apparatus comprising, in combination, a main frame, clamping means carried by the main frame for securing the abutting edges of a blank in position for welding, said clamping means being hinged to the main frame to permit the blank to rotate about a horizontal axis, a back-up member carried by the clamping means and disposed to be positioned underneath the joint to be welded to cooperate with the clamping means in securing the blank in welding position, said back-up member being pivotally mounted on the clamping means to permit the loading of the welding blank thereon at the side of the main frame, and automatic means mounted for movement along the frame for forming a weld along the abutting edges of the joint.

5. Support means for a welding blank comprising, in combination, a main frame, clamping means disposed to be positioned along the edges of the joint to be welded for securing the blank in welding position, said clamping means being hinged to the main frame to permit the rotation of the blank about a horizontal axis, actuating means operatively connected to the clamping means for controlling the positioning thereof in the main frame, and a back-up member carried by the clamping means and disposed to be placed underneath the joint to be welded to cooperate with the clamping means in securing the blank in welding position.

6. Support means for a welding blank comprising, in combination, a main frame, clamping means disposed to be positioned along the edges of the joint to be welded for securing the blank in welding position, said clamping means being hinged to the main frame to permit the rotation of the blank about a horizontal axis, fluid pressure actuating means operatively connected to the clamping means and adapted to be manually controlled for adjusting the positioning of the clamping means in the main frame, and a back-up member carried by the clamping means and disposed to be placed underneath the joint to be welded to cooperate with the clamping means in securing the blank in welding position.

7. Support means for a welding blank comprising, in combination, a main frame, clamping means disposed to be positioned along the edges of the joint to be welded for securing the blank in welding position, said clamping means being hinged to the main frame to permit the blank to rotate about a horizontal axis, a back-up member disposed to be positioned underneath the joint to be welded to cooperate with the clamping means in securing the blank in welding position, said back-up member being pivotally mounted at one end to permit the loading of the welding blank thereon at the side of the main frame, a roller mounted at the other end of the back-up member for rotation about a longitudinal axis of the back-up member, an incline carried by the clamping means and disposed underneath the roller to provide a runway therefor as the back-up member is swung to the side of the main frame, and retaining means for securing the back-up member in welding position.

8. Support means for a welding blank comprising, in combination, a main frame, clamping means disposed to be positioned along the edges of the joint to be welded for securing the blank in welding position, said clamping means being hinged to the main frame to permit the blank to rotate about a horizontal axis, actuating means operatively connected to the clamping means for controlling the positioning thereof in the main frame, a back-up member disposed to be positioned underneath the joint to be welded to cooperate with the clamping means in securing the blank in welding position, said back-up member being pivotally mounted at one end to permit the loading of the welding blank thereon at the side of the main frame, a roller mounted at the other end of the back-up member for rotation about a longitudinal axis of the back-up member, an incline carried by the clamping means and disposed underneath the roller to provide a runway therefor as the back-up member is swung to the side of the main frame, and retaining means for securing the back-up member in welding position.

9. Arc welding apparatus comprising, in combination, a main frame, clamping means carried by the main frame for securing the abutting edges of a blank in position for welding, said clamping means being hinged to the main frame to permit the blank to rotate about a horizontal axis, actuating means operatively connected to the clamping means for controlling the positioning thereof in the main frame, a back-up member carried by the clamping means and disposed to be positioned underneath the joint to be welded to cooperate with the clamping means in securing the blank in welding position, said back-up member being pivotally mounted on the clamping means to permit the loading of the welding blank thereon at the side of the main frame, a roller mounted at the other end of the back-up member, an incline carried by the clamping means and disposed underneath the roller to provide a runway therefor as the back-up member is swung to the side of the main frame, retaining means for securing the back-up member in welding position, and welding electrode feeding means mounted for movement along the frame for forming a weld along the abutting edges of the joint.

JOHN L. BROWN.
THEODORE C. FOCKLER.